United States Patent [19]
Bloch et al.

[11] Patent Number: 5,086,443
[45] Date of Patent: Feb. 4, 1992

[54] BACKGROUND-REDUCING X-RAY MULTILAYER MIRROR

[75] Inventors: Jeffrey J. Bloch; Diane Roussel-Dupre'; Barham W. Smith, all of Los Alamos, N. Mex.

[73] Assignee: The United States of America as represented by the United States Department of Energy, Washington, D.C.

[21] Appl. No.: 562,297

[22] Filed: Aug. 3, 1990

[51] Int. Cl.$^5$ .............................................. G21K 1/06
[52] U.S. Cl. ..................................... 378/145; 378/84; 378/156
[58] Field of Search ............... 378/145, 156, 158, 84, 378/85, 34, 35, 43

[56] References Cited

U.S. PATENT DOCUMENTS

| | | | |
|---|---|---|---|
| 4,785,470 | 11/1988 | Wood et al. | 378/84 |
| 4,969,175 | 11/1990 | Nelson et al. | 378/84 |

OTHER PUBLICATIONS

Jerry Edelstein, "Reflection/Suppression Coatings for 900-1200 A Radiation", SPIE X-Ray/EUV Optics for Astronomy and Microscopy, vol. 1160, 19-25 (1989).
Barham W. Smith et al., "Metal Multilayer Mirrors for EUV/Ultrasoft X-Ray Wide-Field Telescopes", Opt. Eng. 29, 592-596 (1990).
M. Born et al., *Principles of Optics Electromagnetic Theory of Propagation, Interference and Diffraction of Light* (Pergamon Press, London, 1959), pp. 54-69.
D. L. Windt, "Optical Constants for Thin Films of Ti, Zr, Nb, Mo, Ru, Rh, Pd, Ag, Hf, Ta, W, Re, Ir, Os, Pt, and Au from 24 A to 1216 A", Appl. Opt. 27, 246 (1988).
E. B. Palik, *Handbook of Optical Constants of Solids* (Academic Press, New York, 1985), pp. 547-569.
Underwood et al., "Layered Synthetic Microstructures: Properties and Applications in X-Ray Astronomy", SPIE, vol. 184, *Space Optics Imaging X-ray Optics Workshop*, 1979, pp. 123-130.

Primary Examiner—Janice A. Howell
Assistant Examiner—David P. Porta
Attorney, Agent, or Firm—Samuel M. Freund; Paul D. Gaetjens; William R. Moser

[57] ABSTRACT

Background-reducing x-ray multilayer mirror. A multiple-layer "wavetrap" deposited over the surface of a layered, synthetic-microstructure soft x-ray mirror optimized for reflectivity at chosen wavelengths is disclosed for reducing the reflectivity of undesired, longer wavelength incident radiation incident thereon. In three separate mirror designs employing an alternating molybdenum and silicon layered, mirrored structure overlaid by two layers of a molybdenum/silicon pair antireflection coating, reflectivities of near normal incidence 133, 171, and 186 Å wavelengths have been optimized, while that at 304 Å has been minimized. The optimization process involves the choice of materials, the composition of the layer/pairs as well as the number thereof, and the distance therebetween for the mirror, and the simultaneous choice of materials, the composition of the layer/pairs, and their number and distance for the "wavetrap."

8 Claims, 2 Drawing Sheets

BACKGROUND-REDUCING X-RAY MULTILAYER MIRROR

BACKGROUND OF THE INVENTION

The present invention relates generally to x-ray reflectors, and more particularly to a wavelength-selective wavetrap for reducing unwanted longer-wavelength background reflections from a mirror designed for high reflectivity in a chosen x-ray band of the electromagnetic spectrum.

The ALEXIS (Array of Low Energy X-Ray Imaging Sensors) satellite is designed to survey the entire sky in three narrow wavelength bands (186, 171, and 133 Å) with a spectral resolution of about 5% and a spatial resolution of 0.5°. Each telescope on the satellite has a field-of-view of 33° and utilizes a metal multilayer mirror at near normal incidence (12.5°-7.6° from the normal) to focus cosmic ultrasoft x-ray and extreme ultraviolet light onto a curved microchannel-plate detector. Each mirror consists of 60 to 100 alternating layers of molybdenum and silcon. Unfortunately, there is a strong geocoronal line of He II at 304 Å, which causes severe background interference difficulties in the detection of the shorter wavelength radiation. Use of bandwidth-limiting filters in this region severely compromises performance since materials that absorb the 304 Å radiation also significantly attenuates the wavelength of primary interest.

The design of selective-reflection, selective-suppression optical coatings that optimize both high reflectivity at a desirable wavelength and low reflectivity at an undesirable wavelength are well known for wavelengths longer than 1200 Å. For example, multiple-layer dielectric-metal optical coatings have been used extensively throughout the far ultraviolet region. For wavelengths shorter than 1200 Å, but longer than 900 Å, transmissive spacing layers such as magnesium fluoride and lithium fluoride, and scattering layers such as aluminum, aluminum oxide, gold, silicon, and silicon dioxide have been found useful, as is described in ("Reflection/Suppression Coatings For 900-1200 Å Radiation," by Jerry Edelstein, SPIE Vol. 1160, X-Ray/EUV Optics For Astronomy And Microscopy (1989), pages 19-25.

In the extreme ultraviolet, ultrasoft x-ray region, which is of great interest for astrophysical research, thin layers of materials having large differences in optical properties are employed. As stated above, molybdenum and silicon are two such materials. One multiple-layer mirror design having alternate molybdenum and silicon layers that reduce 304 Å reflection simply decreases the thickness of the molybdenum layers while keeping the spacing between successive molybdenum layers the same. When the molybdenum occupies less than about 20% of the spacing, the 304 Å reflectivity is reduced to less than $10^{-3}$. However, the peak reflectivity is also reduced to about 70% of the attainable maximum.

Accordingly, it is an object of the present invention to provide a metal, multilayer mirror having maximum reflectivity at chosen wavelengths in the soft x-ray, extreme-ultraviolet region of the electromagnetic spectrum at roughly normal incidence, while suppressing undesirable longer wavelength radiation by means of an antireflection coating also constructed as part of the metal multilayer structure.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the multilayer x-ray mirror hereof having significant reflectivity at chosen shorter wavelengths of incident x-radiation, while suppressing reflectivity at chosen longer incident x-radiation wavelengths, includes a plurality of layers having a chosen thickness of a first high-Z material each interposed with a layer of a first low-Z material having a chosen thickness, the sum of the thicknesses of a pair of first high-Z and low-Z layers defining a first distance, at least one second high-Z material having a chosen thickness facing the incident x-radiation, and separated from the first high-Z material layer closest to the incident x-radiation by a second low-Z material layer having a chosen thickness, forming thereby, at least one pair of layers having a thickness equal to the sum of the thicknesses of the second high-Z and low-Z material layers, this pair forming a "wavetrap" for the incident x-radiation for which the reflectivity thereof is to be suppressed.

Preferably, there are two-layer pairs of second high-Z and low-Z material layers. It is also preferred that the high-Z and low-Z material layers include molybdenum and silicon, respectively, for primary wavelengths between 250 and 125 Å.

Benefits and advantages of the subject invention include high reflectivity at target wavelengths in the soft x-ray region of the electromagnetic spectrum and low reflectivity of longer-wavelength background radiation for curved multilayer mirrors.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

DETAILED DESCRIPTION OF THE INVENTION

Briefly, the present invention includes the use of a multiple-layer "wavetrap" deposited over the surface of a layered, synthetic-microstructure soft x-ray mirror optimized for reflectivity at chosen wavelengths for reducing the reflectivity of undesired, longer wavelength incident radiation thereon. In three separate mirror designs employing an alternating molybdenum and silicon layered mirror structure overlaid by two layers of a molybdenum/silicon pair antireflection coating, reflectivities at the wavelengths 133, 171, and 186 Å have been optimized, while that at 304 Å has been minimized. The optimization process involves the choice of materials, the composition of the layer/pairs as well as the number thereof, and the distance therebetween for the mirror, and the simultaneous choice of materials, the composition of the layer/pairs, their number and distance for the "wavetrap."

Many of details of the present invention are disclosed in the journal article entitled "Metal Multilayer Mirrors For EUV/Ultrasoft X-Ray Wide-Field Telescopes," by Barnham W. Smith, Jeffrey J. Bloch, and Diane Roussel-Dupre, Optical Engineering 29. 592 (1990), the teachings of which are hereby incorporated by reference herein.

Figure 1:
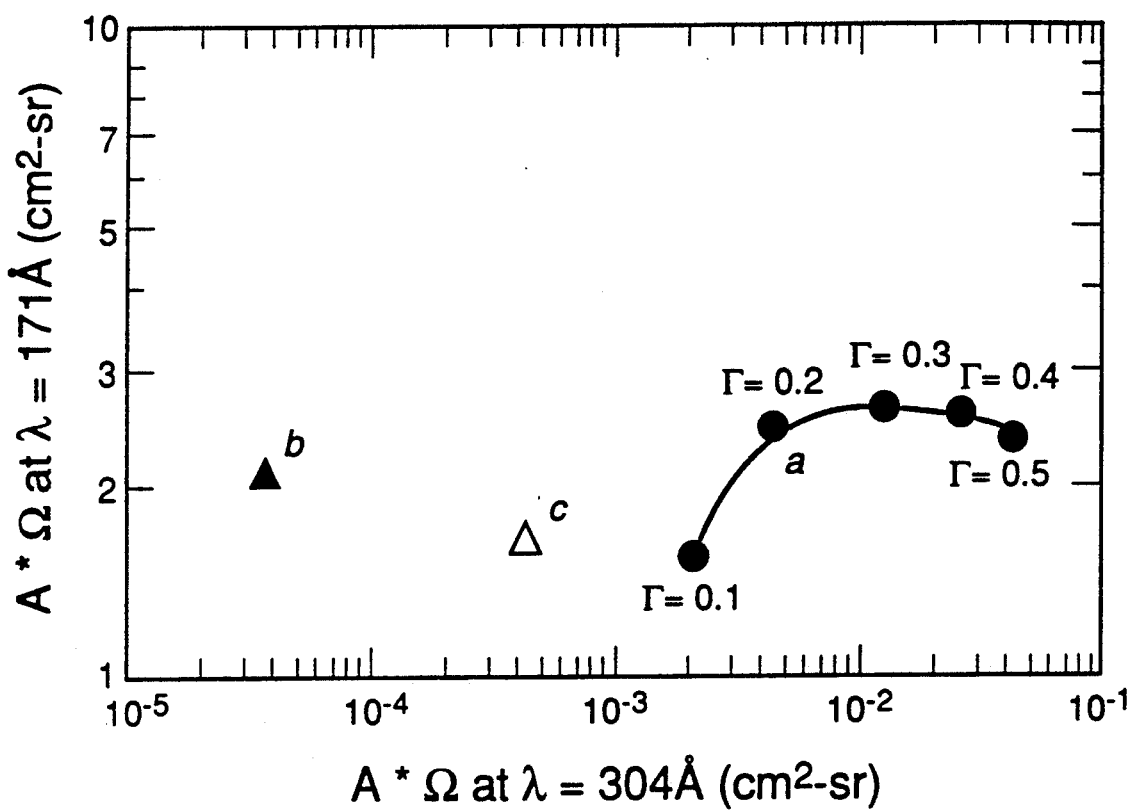
FIG. 1 is a performance plot of the expected performance of layered, synthetic-microstructure mirrors designed for 171 Å bandpass in the ALEXIS telescope system.

Reference will now be made in detail to the present preferred embodiment of the invention, an example of which is illustrated in the accompanying drawings. Turning now to FIG. 1 hereof, there is plotted the performance of layered, synthetic-microstructure mirrors showing the effects of employing the "wavetrap" of the present invention versus varying the composition of the layers of the mirror. $A^*\Omega$ represents a telescope's total area-solid-angle product, and is a measure of a multilayer mirror's performance as it operates within a telescope. To determine $A^*\Omega$ of a telescope at a given wavelength, the differential contribution of incident rays reflected from the mirror multiplied by the multilayer reflectivity curve for the mirror must be integrated as a function of incidence angle for that wavelength. The goal is to maximize the reflectivity at 171 Å, but minimize the reflectivity for the background radiation at 304 Å. Therefore, improved mirror designs are to be found toward the left and top of the plot. FIG. 1a shows the theoretical performance of a molybdenum/silicon multilayer mirror without the "wavetrap" of the present invention as the thickness of the molybdenum layer is varied. $\Gamma$ is given by the relationship $\Gamma$=Mo layer thickness/(Mo layer thickness+Si layer thickness). FIG. 1b represents the theoretical performance of the 171 Å optimized "wavetrap," while FIG. 1c represents a conservative empirical estimate of how well the "wavetrap" of the present invention will work based on fabricated samples.

Optimizations were performed to determine the layer thicknesses yielding the best compromise of high reflectivity for the chosen soft x-ray wavelengths and low response for selected background radiation having longer wavelength. Multilayer reflectivity models were computed with a computer code that uses the complex matrix solution method of M. Born and E. Wolf, *Principles Of Ootics*, Pergammon Press, London (1959), while optical constants employed for molybdenum and silicon were obtained from D. L. Windt, Appl. Opt. 27. 246 (1988), and E. B. Palik, *Handbook Of Optical Constants*. Academic Press, New York (1985), respectively.

Peak reflectivity for the desired angle $\theta$ is obtained using the Bragg condition for the working wavelength to initially set the spacing of the Mo/Si layers (Bragg condition: $2d\sin\theta = n\lambda$, where d is the total thickness of the Mo and the Si layers in each layer pair, $\theta$ is the angle of reflection from the surface, n is a positive integer and equals unity in this case, and $\lambda$ is the wavelength). Further fine tuning is necessary because of refraction, absorption, and atom migration in the interface between the surfaces when the layers are set down, as will be set forth below.

While maximizing the reflectivity in each mirror's bandpass, it is necessary to minimize sensitivity to background emissions. As stated above, the most serious background for the ALEXIS telescope system in low earth orbit is the geocoronal emission of ionized helium at 304 Å. This radiation is quite intense, perhaps $10^5$ times the signal for which measurements are desired in the soft x-ray region from hot, intersteller plasma and other cosmic sources. Therefore, it is necessary to achieve a rejection ratio of at least $10^6$ between 304 Å and the peak wavelength for each mirror. A "wavetrap" consisting of two-layer pairs with a different d spacing from that of the multilayered mirror is deposited on top of the other layers. Generally, mirrors are fabricated with a silicon (low-Z) layer farthest from the incident radiation, and a molybdenum (high-Z) layer facing the source of incident radiation, so that the first layer of the "wavetrap" is deposited directly on the high-Z material of the mirror, and is itself a low-Z material. To suppress reflection at 304 Å , the spacing of these extra two-layer pairs are such that standing-wave patterns are set up which destructively interfere with the reflected wave. The 304 Å radiation is then absorbed within the multilayer. It should be mentioned that experiments using one-layer pair and three-layer pairs were performed so the result that the former did not yield sufficient rejection of the 304 Å radiation, while the latter exhibited excessive absorption of the wavelength for which the mirror reflectivity was optimized. Therefore, two-layer pairs were found to be optimal. Since the destructive standing waves of 304 Å radiation in the top two layers interact with the structure of the multilayer mirror below them as a boundary condition, the exact d spacing of the "wavetrap" and the mirror must simultaneously be optimized. That is, the exact d spacing of the "wavetrap" will be different for each type of mirror. Calculations predict the 186 Å design will have a peak reflectivity of 35% for the 186 Å radiation, and a 304 Å reflectivity of less than $10^{-5}$, compared with a peak reflectivity of 40% and a 304 Å reflectivity of $10^{-3}$ without a "wavetrap."

Having generally described the present invention, the following example is provided to more particularly set forth the details of apparatus hereof.

EXAMPLE

Optimized mirrors for three soft x-ray wavelengths have been designed and fabricated as is illustrated in the Table. Therein, the thicknesses of the high-Z material and low-Z material for both the mirrors and their associated "wavetraps are provided." Mirrors were constructed having between sixty and one hundred layers and, as stated above, "wavetraps" were found to optimize at two-layer pairs. These mirror designs effectively reject the reflections from 304 Å radiation.

TABLE

| Wavelength | Mirror: | | "Wavetrap" | |
|---|---|---|---|---|
| | Mo | Si | Mo | Si |
| 186 Å | 31 Å | 70 Å | 11 Å | 47 Å |
| 170 Å | 35 Å | 58 Å | 11 Å | 45 Å |
| 130 Å | 28 Å | 42 Å | 10 Å | 45 Å |

Calculations for the 186 Å wavelength situation suggested that the molybdenum and silicon thicknesses for the mirror and "wavetrap" should be 38 and 74 Å, and 10 and 55 Å, respectively, as opposed to the values quoted in the Table. When fabricated, although the mirror having these dimensions had a wavelength for peak reflectivity at 186 Å, that for the peak rejection efficiency was not at 304 Å. This is thought to be due to migration of the atoms of one layer into another during the deposition process or surface contamination. That is, the layer thicknesses are not precisely defined. Empirical studies and modification of the calculations provided a route to prediction of the optimized values.

Figure 2A:
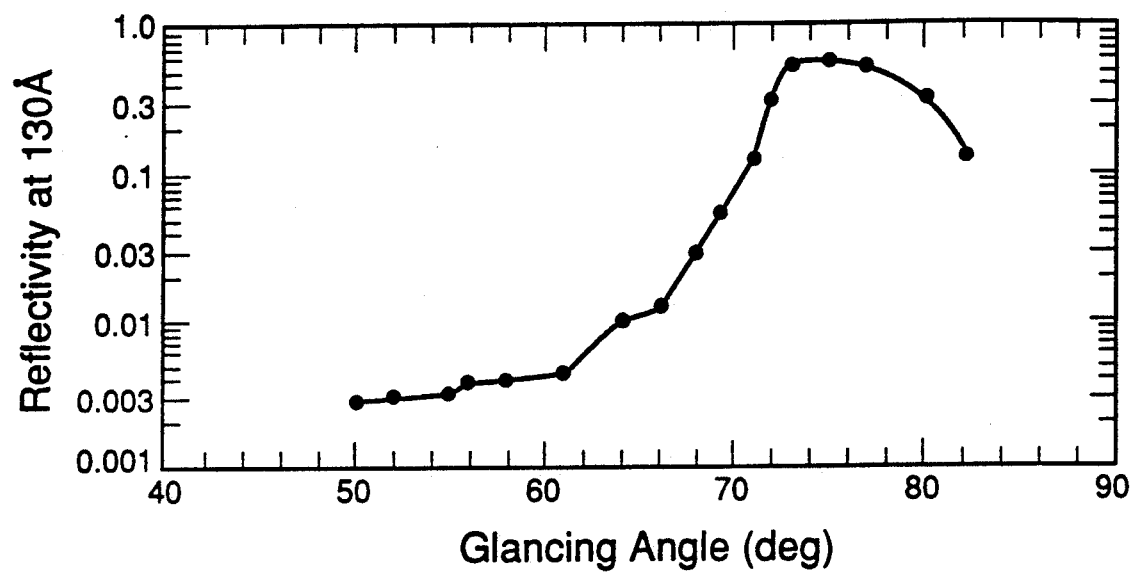
FIG. 2a is plot of the experimentally determined reflectivity of 130 Å radiation as a function of incident angle versus that of 304 Å radiation (FIG. 2b) for a multilayer mirror employing a "wavetrap" according to the teachings of the present invention.
Figure 2B:
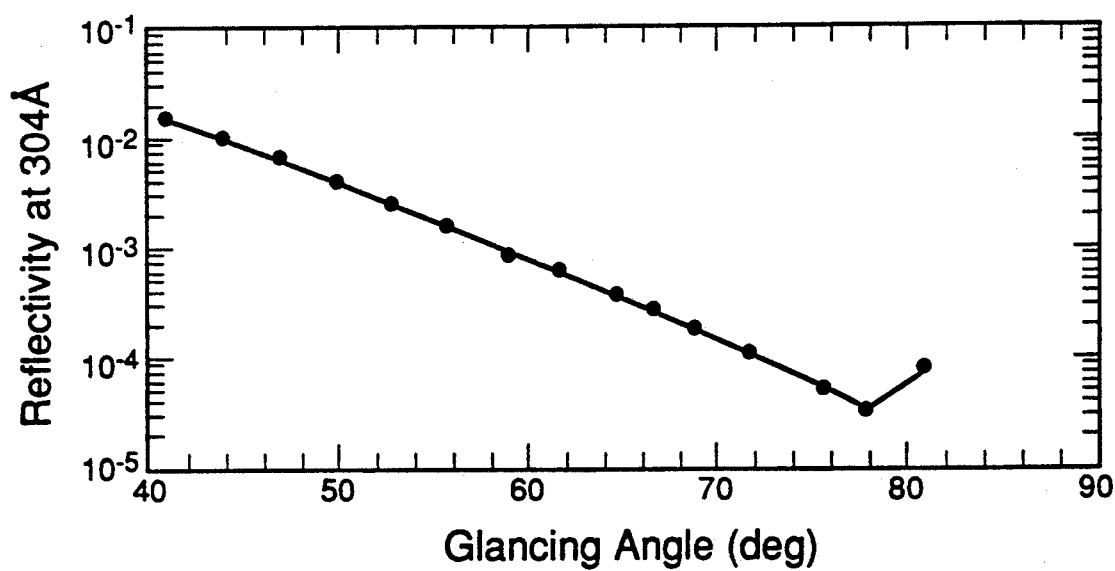

FIGS. 2a and 2b show the reflectivity for 130 Å radiation and that for 304 Å radiation, respectively, as a function of incidence angle for a typical mirror.

As stated, a major problem in the fabrication of multilayer mirrors according to the teachings of the present invention is the layer-to-layer uniformity of the sputtered layers, since only a well-defined layered structure will provide the constructive interference required for maximum reflectivity. The boundary definition can be determined from the number of satellite peaks observed at $Cu-K_\alpha$. A typical fabricated mirror may have as many as sixteen higher orders visible in a diffractometry measurement. Therefore, attempts to model the $Cu-K_\alpha$ measurements with more than 0.5 Å or ±0.5% deviation of the thickness fails to reproduce the observations, indicating that the mirrors are uniform to within this diagnostic's capabilities. However, the empirical fine-tuning required to optimize the "wavetrap" specifications indicates that the thicknesses may not be exact. Another possibility is that the optical constants derived from the literature are slightly incorrect.

Other issues include the two-dimensional uniformity over the surface of the mirror. Nonuniform distances between the substrate and the sputtering system for curved pieces are the source of nonuniformities in layer thickness. Tests on fabricated mirrors show ±1% uniformity in the d spacings over the surface over several centimeters diameter piece, and ±1.5% over a 15 cm diameter circle.

The foregoing description of several preferred embodiments of the invention has been presented for purposes of illustration and description. It is not intended to be exhaustive or to limit the invention to the precise form disclosed, and obviously many modifications and variations are possible in light of the above teaching. For example, although x-ray mirrors for telescopes have been described herein, it would be apparent to one having ordinary skill in the art of x-ray optics that the teachings of the present invention are applicable to focusing mirrors for x-ray lithography procedures using a free-electron laser where the absence of suitable optics currently requires the use of masks having the same dimensions as the circuit dimensions desired on the final integrated circuit chips. The free-electron laser source presents special problems that are solvable using our invention, since a number of harmonics (longer wavelength) of the soft x-ray wavelength to be generated are also present in the laser output. Removal of these harmonics is essential to provide the high resolution required for current lithography processes, since diffraction problems increase as the wavelength increases. Moreover, materials such as tungsten and carbon are known to have good optical properties in the soft x-ray region of the electromagnetic spectrum and are suitable for fabrication of the multilayer mirrors and "wavetraps" of the subject claimed invention. The embodiments were chosen and described to explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A multiplayer mirror having signfiicant reflectivity at a signle chosen shorter wavelenght o incident x-radiation, while suppressing the reflectivity t a single chosen longer incident wavelenght, comprising in combination:
   a. a plurality of layers of a first high-Z material, each of said first high-Z material layers having a first thickness and being sapced apart from each other;
   b. a plurality of layers of a first low-Z material, each of said first low-Z material layers having a second thickness, said low-Z material layers and said high-Z material layers being disposed such that a low-Z material material layer, such that the plurality of first high-Z material layers and the plurality of interspersed first low-Z material layers efficiently reflect the chosen wavelenght of incident x-radiation;
   c. t least one second high-Z material layer having a third thickness and disposed such that said at leat one second high-Z material layer receives the incident x-radiation; and
   d. at least one second low-Z material layer having a fourth thickness, said at least one second low-Z material layer disposed between said at least one second high-Z material layer and the one of said first high-Z material layers which is the first to receive the incident x-radiation, forming thereby at least one pair of antireflection layers such that said at least one layer pair is a wavetap for the chosen wavelenght of incident longer-wavelenght radiation for which the reflectivity thereof is to be suppressed.

2. The multilayer mirror as described in claim 1, wherein said at least one second hight 2- material layer and said at least one second low-2 material layer include two-layer pairs.

3. The multilayer mirror as described in claim 2, wherein said first high-Z material layer, said second high-Z material layer, said first low-Z material layer, second thickness, the third thickness, and the fourth thickness are optimized to maximize reflection of the chosen shorter wavelength of soft x-radiation, while suppressing reflection of the chosen longer wavelenght of radiation.

4. The multilayer mirror as described in claim 3, wherein said first high-Z material layer and said second high-Z material layer include metallic atoms, and wherein said first low-Z material layer and said second low-Z material layer include nonmetallic atoms.

5. The multilayer mirror as described in claim 4, wherein said first high-Z material layer and said second high-Z material layer include molybdenum atoms, and wherein said first low-Z material layer and said second low-Z material layer include silicon atoms.

6. The multilayer mirror as described in claim 5, wherein the first thickness is about 31 Å and the second thickness is about 70 Å, and wherein the third thickness is about 11 Å and the fourth thickness is about 47 Å, whereby the reflectivity of 186 Å radiation is maximized, while that at 304 Å is suppressed.

7. The multilayer mirror as described in claim 5, wherein the first thickness is about 35 Å and the second thickness is about 58 Å, and wherein the third thickness is about 11 Å and the fourth thickness is about 45 Å, whereby the reflectivity of 170 Å radiation is maximized, while that at 304 Å is suppressed.

8. The multilayer mirror as described in claim 5, wherein the first thickness is about 28 Å and the second thickness is about 42 Å, and wherein the third thickness is about 10 Å and the fourth thickness is about 45 Å, whereby the reflectivity of 130 Å radiation is maximized, while that at 304 Å is suppressed.

* * * * *